United States Patent [19]

Shelly

[11] 4,371,826

[45] Feb. 1, 1983

[54] NON-DISSIPATIVE BATTERY CHARGE CIRCUIT

[75] Inventor: Randolph D. W. Shelly, Rosemere, Canada

[73] Assignee: Sperry Corporation, New York, N.Y.

[21] Appl. No.: 225,768

[22] Filed: Jan. 16, 1981

[51] Int. Cl.³ .............................................. H02J 7/04
[52] U.S. Cl. ...................................... 320/21; 320/32; 320/40
[58] Field of Search ....................... 320/20, 21, 22-24, 320/32, 39, 40, DIG. 1

[56] References Cited

U.S. PATENT DOCUMENTS

| | | | |
|---|---|---|---|
| 3,293,445 | 12/1966 | Levy | 320/DIG. 1 |
| 3,576,487 | 4/1971 | Chase | 320/39 |
| 3,602,794 | 8/1971 | Westhaver | 320/22 X |
| 3,959,707 | 5/1976 | Stephens | 320/22 X |

Primary Examiner—R. J. Hickey
Attorney, Agent, or Firm—Charles A. Johnson; Kenneth T. Grace; Marshall M. Truex

[57] ABSTRACT

A non-dissipative battery charging circuit utilizing pulse width modulated constant current charging signals and having unregulated charging voltage stepped down by the use of a switching transistor and series inductor is described. Charging current is sensed and fed back to cause control of the charging cycle. Battery voltage is sensed and compared to a reference level for terminating charging when the battery is determined to be fully charged. A clocking and control system responsive to the feedback signals and the sensed voltage levels is described for controlling the activation and duration of application of charging current signals.

9 Claims, 5 Drawing Figures

NON-DISSIPATIVE BATTERY CHARGE CIRCUIT

BACKGROUND OF THE INVENTION

This invention relates to battery charge systems, and more particularly to an improved non-dissipative system for charging batteries.

In systems for charging storage batteries, for example of the lead-acid type, utilizing an unregulated voltage source having a higher value than the battery to be charged, it has been common to utilize dissipative series pass elements for the charging and regulation system. The use of dissipative systems is inefficient to the extent that there is generated heat that must be removed or dissipated from the system, and is inefficient in the losses that are inherent. Various types of prior art systems utilize charging systems having dissipative series type regulators are subject to the inefficiencies mentioned. In storage systems where energy conservation is a concern, both from the standpoint of energy needed to accomplish charging and the need to dissipate excess heat, it is desirable to provide a system for providing the battery charging operation without significant losses. It has been determined that pulse width modulated inverter technology can be advantageously utilized to accomplish regulated battery charging utilizing a non-dissipative reactive drive, thereby resulting in a low loss battery charging system.

SUMMARY OF THE INVENTION

With the foregoing background of the invention in mind, and in accordance with the present invention, an improved battery charging system is described. The present invention utilizes pulse width modulated circuitry to charge a battery from a DC source having a higher voltage level than the battery voltage being charged. The system accommodates an unregulated source of charging voltage. The battery is charged by delivering to the battery pulses of current of fixed amplitude. These pulses essentially provide a DC current with an AC component such that the maximum amplitude of the current applied during a charging pulse time is fixed. The invention utilizes a charging current switch, which can be considered as a chopper transistor, in conjunction with a series reactive impedance, such as an inductor, to step the applied charging voltage down to the battery voltage. The use of the transistor switch and the series impedance is essentially non-dissipative, and results in negligible power loss. The charging current is sensed by control logic and compared to a reference such that the current applied is fixed. The system senses the battery float voltage which is fed back to charge cycle control circuitry which terminates the battery charging operation when the battery is fully charged, that is exhibits a full predetermined voltage level. In this manner, the regulation of the charge of the battery is accomplished on the actual float voltage of the battery, rather than on the voltage that occurs during charge.

OBJECTS

In view of the foregoing Background of the Invention and the Summary of the Invention, it is therefore an object of this invention to provide an improved battery charging and regulating circuit.

It is a further object of this invention to provide an improved non-dissipative battery charging circuit utilizing pulse width modulation circuitry.

Still a further object of this invention is to provide an improved non-dissipative battery charging and regulator circuit utilizing a series impedance in the charging path.

Yet another object of this invention is to provide an improved non-dissipative battery charging circuit and regulator utilizing a chopper transistor for driving a series inductance for charging a battery from an unregulated voltage source higher in value than the battery voltage to be charged.

Still a further object of this invention is to provide an improved battery charging system that delivers pulses of current of fixed amplitude through a series inductor for charging a battery.

Yet a further object of this invention is to provide an improved non-dissipative battery charging and voltage regulation system utilizing a chopper transistor and series impedance for charging a battery, together with feedback control circuitry for limiting the level of the current pulse to be applied, and further sensing the float voltage for determining when charging should be terminated.

These and other objects and advantages of the invention will become apparent to those having skill in the art upon the reading of the following detailed description when taken in conjunction with the accompanying drawings in which:

DESCRIPTION OF THE PREFERRED EMBODIMENT

Figure 1:
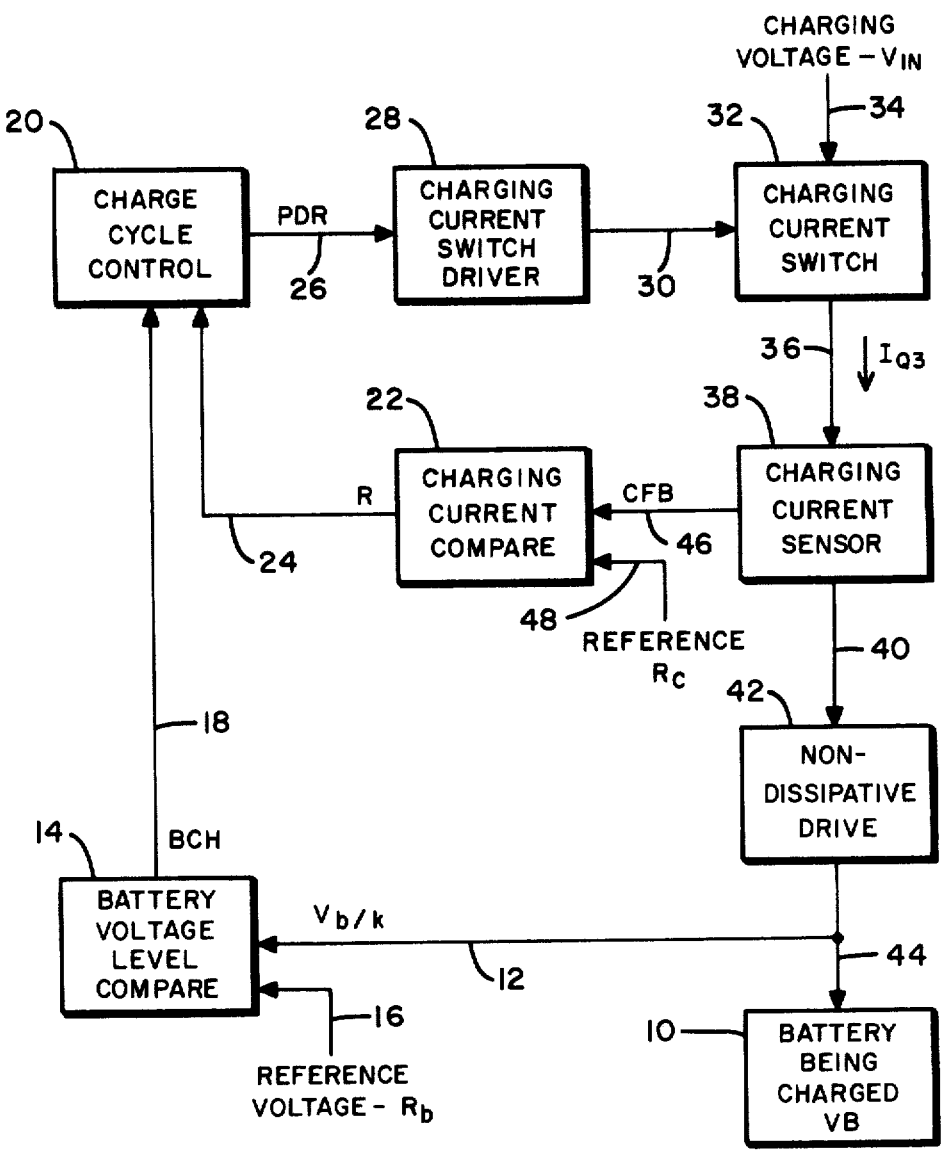
FIG. 1 is a simplified block diagram of a non-dissipative battery charging circuit of the subject invention.

FIG. 1 is a simplified block diagram of a non-dissipative battery charging circuit of the subject invention. The Battery Being Charged VB10 is coupled by line 12 to the Battery Voltage Level Compare 14, which in turn receives a Reference Voltage $R_b$ on line 16. When the battery is not fully charged, the Battery Voltage Level Compare 14 provides a BCH signal on line 18 that indicates that the battery is not fully charged. For this embodiment, a Low signal on line 18 indicates that the battery is not fully charged, and the Low BCH signal is applied to the Charge Cycle Control circuitry 20. This circuitry includes a Clock and enabling logic, that will be described in more detail below, that evaluates the BCH signal in conjunction with a feedback signal received from the Charging Current Compare circuitry 22 as received on line 24, and provides a control signal PDR on line 26 when a charging cycle is to be initiated. The PDR signal activates the Charging Current Switch Driver 28 for a charging cycle. This provides an activating signal to coupling line 30 which activates the Charging Current Switch 32. Switch 32 is adapted to receive the Charging Voltage $V_{IN}$ on line 34, and when turned ON by the signal received on coupling line 30, results in a current flow $I_{Q3}$ on line 36. This current flow is applied to the Charging Current Sensor 38 which passes the current flow through on line 40 to the Non-Dissipative Drive circuitry 42. The charging current is provided on line 44 as charging current to the Battery VB. The Charging Current Sensor 38 also provides a current feedback signal CFB on line 46 that is applied to the Charging Current Compare circuitry 22. This feedback current is compared to a Reference $R_c$ which is received on line 48. When the current flow in line 36 reaches a predetermined level in comparison to Reference $R_c$ the Charging Current Compare circuitry 22 issues a reset pulse R on line 24 that causes the Charge Cycle Control circuitry 20 to disable the charging cycle. If the Battery VB is not fully charged, the clock circuitry in the Charge Cycle Control 20 will initiate subsequent charging cycles, which will continue until such time as the BCH signal on line 18 indicates that the battery is fully charged. For this embodiment, it should be noted that the voltage level on line 12 is utilized as a fraction of the float voltage of the Battery VB as indicated by the level $V_{b/k}$, as will be decribed in more detail below.

Figures 2, 2A:
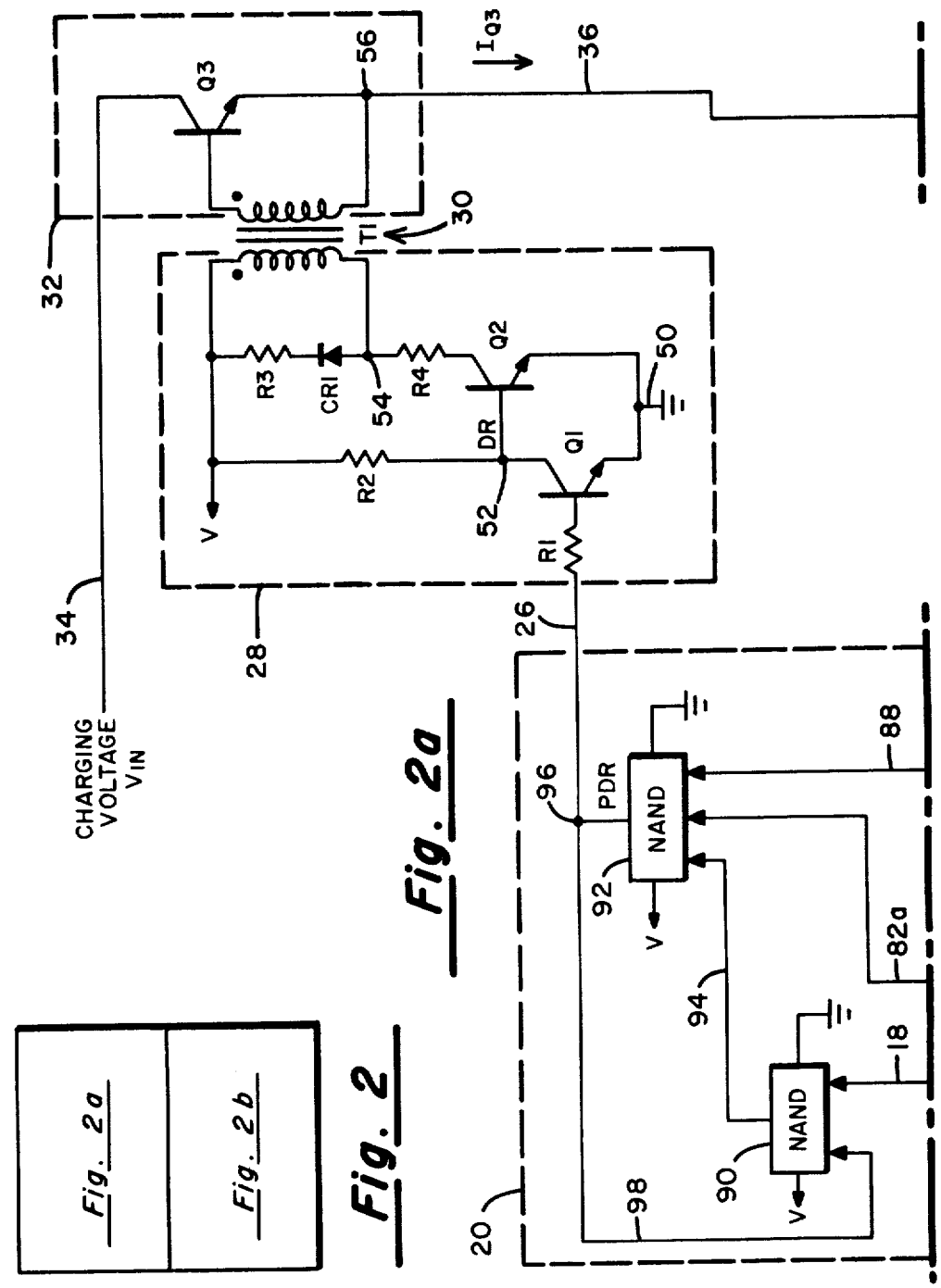
FIG. 2a and FIG. 2b, when arranged as shown in FIG. 2, are a detailed circuit schematic diagram of the non-dissipative battery charging circuit of this invention.
Figure 2B:
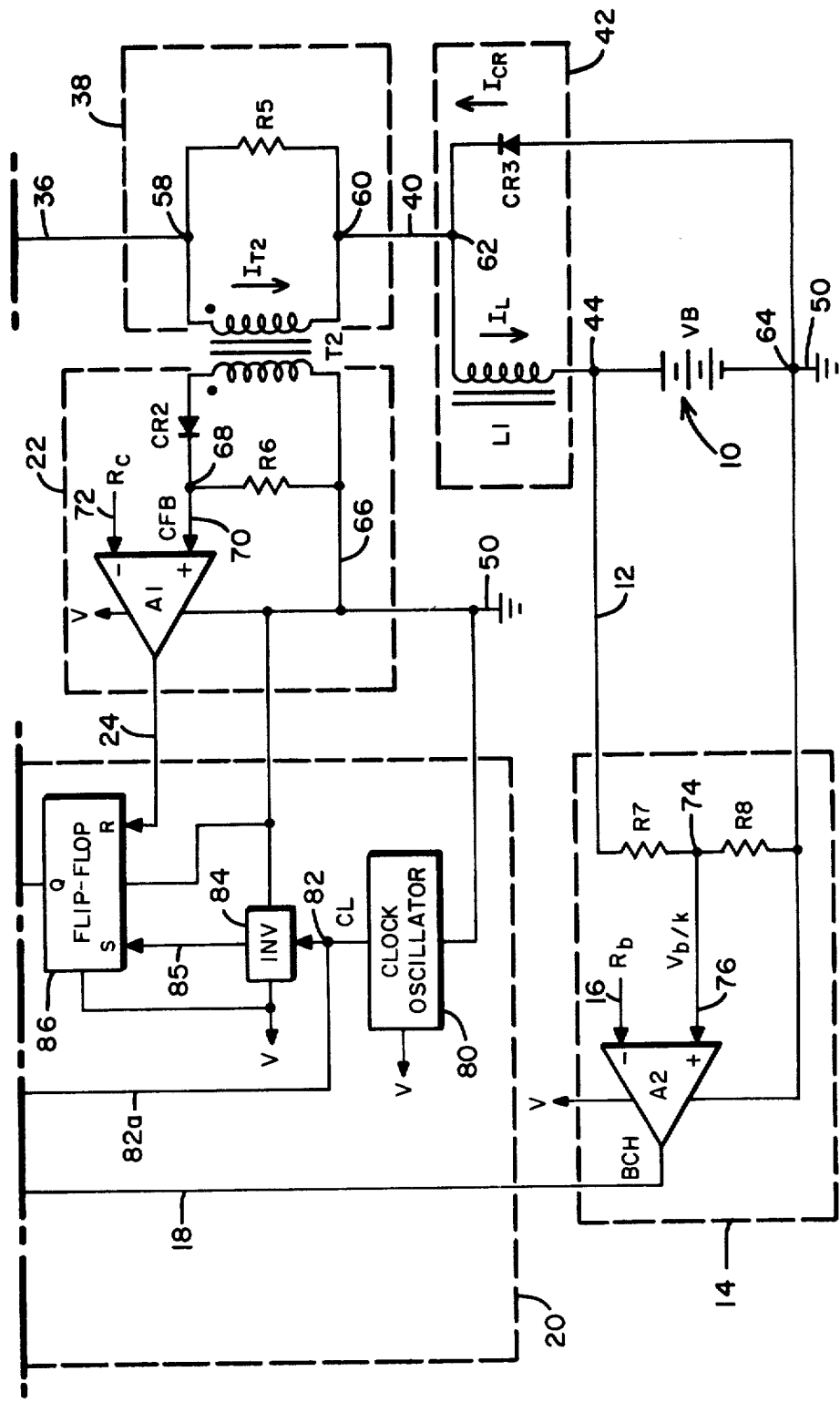

FIG. 2a and FIG. 2b, when arranged as shown in FIG. 2, are a detailed circuit schematic diagram of the non-dissipative battery charging circuit of this invention. This circuit diagram illustrates detail circuit interconnections and discrete circuit components and discrete logic circuits to describe a preferred embodiment of the invention. It is understood that elements that have been previously described will bear the same reference numerals.

The Charging Current Switch Driver shown enclosed in dashed block 28, is comprised of pre-drive switching Transistor Q1 whose base terminal is coupled to base current limiting resistor R1, whose emitter electrode is coupled to a source of reference voltage such as ground 50, and whose collector electrode is coupled to circuit junction 52. A driver Transistor Q2 has its base electrode coupled to junction 52, its emitter electrode coupled to voltage source 50, and its collector electrode coupled to current limiting resistor R4. Resistor R2 is coupled from circuit junction 52 to a voltage source V and functions to limit the base current flow in Transistor Q2. One winding of Pulse Transformer T1, labeled 30, is coupled across circuit junction 54 and to the source of voltage V. Diode CR1 has its anode terminal coupled to circuit junction 54 and its cathode terminal coupled to Resistor R3, with the other terminal thereof coupled to the source of voltage V. Diode CR1 and Resistor R3 function as the reset Diode and reset Resistor respectively for Pulse Transformer T1.

The Charging Current Switch is shown enclosed in dashed block 32, and comprises a bipolar npn switching Transistor Q3 which has its collector coupled to line 34 for receiving the Charging Voltage $V_{IN}$. The base of Transistor Q3 is coupled to one terminal of a second winding of Pulse Transformer T1 with the other terminal of the second winding coupled to the emitter electrode of Transistor Q3 at circuit junction 56.

The circuit operation is such that a Low signal at the base of Transistor Q1 causes it to switch to the non-conductive state, which results in the Drive signal DR being applied to the base of Transistor Q2 which switches it to the current conducting state. When Transistor Q2 is conducting, Pulse Transformer T1 will couple a control signal to the base terminal of Transistor Q3 which will cause it to conduct and provide the current signal $I_{Q3}$ on line 36. When Transistor Q1 receives a High signal at its base, circuit operation reverses, whereby Transistor Q1 is switched to the current conducting state which provides a deactivating DR signal at the base of Transistor Q2, thereby turning it to the non-conductive state. This allows Pulse Transformer T1 to reset through Diode CR1 and Resistor R3, and provides a bias signal to Transistor Q3 which causes it to switch to the current non-conductive state.

The Charging Current Sensor shown in dashed block 38, comprises one winding of Current Transformer T2, which is coupled across circuit junctions 58 and 60 respectively. Current conducting line 36 is coupled to circuit junction 58 and current conducting line 40 is coupled to circuit junction 60. Resistor R5 is coupled across circuit junctions 58 and 60, and functions as the discharge or reset path for Current Transformer T2. In this configuration it can be seen that the relatively low impedance of the winding coupled across circuit junctions 58 and 60 will result in the majority of the current $I_{Q3}$ flowing through the primary winding, with the winding current being identified as $I_{T2}$.

The Non-Dissipative Drive circuitry is shown within dashed block 42, and comprises a series coupled Inductor L1 coupled to circuit junction 62 and to circuit junction 44. Current conducting line 40 is coupled to circuit junction 62 and provides the current flow path for charging Inductor L1 and providing the charging current flow $I_L$ to the Battery VB. Diode CR3 has its cathode terminal coupled to circuit junction 62 and its anode terminal coupled to circuit junction 64 which in turn is coupled to the other terminal of the Battery that is being charged. Diode CR3 is the discharge diode for Inductor L1 and conducts current $I_{CR}$ when Inductor L1 is discharging at the termination of conduction of Transistor Q3.

The Charging Current Compare circuitry is shown in dashed block 22. A second winding of Current Transformer T2 has one terminal coupled to circuit line 66 which in turn is coupled to a source of voltage 50. The other terminal of the second winding is coupled to the anode terminal of Diode CR2 and the cathode terminal is coupled to circuit junction 68. Diode CR2 functions as a sense current rectifier. Resistor R6 is coupled across circuit junction 68 and line 66, and functions to convert the current sensed to a corresponding voltage level that becomes the feedback voltage for providing the feedback signal CFB as an input on line 70 to one terminal of Operational Amplifier A1. A Reference $R_c$ is applied on line 72 as the other input to Operational Amplifier A1. The Operational Amplifier A1 operates as a voltage comparator and provides a High signal on line 24, denoted the R signal, as will be described in more detail below, when the two input voltages compare. At all other times, the output signal on line 24 will be Low. Thus it can be seen that when the sensed current in Current Transformer T2 reaches a predetermined level, as determined by the voltage drop across Resistor R6, the Operational Amplifier will determine that the charging cycle should be terminated and will issue the appropriate control signal R on line 24. The functioning of the signal R will be described in more detail below.

The Battery Voltage Level Compare circuitry is shown in dashed block 14. The float voltage appearing on line 12 will be utilized in conjunction with the Reference Voltage $R_b$ to determine when the Battery is fully charged. In this regard, a resistor divider comprised of Resistor R7 and Resistor R8 is utilized. Resistor R7 is coupled across circuit junction 44 and circuit junction 74 and Resistor R8 is coupled across circuit junction 74 and 64. The values of Resistor R7 and Resistor R8 are chosen to scale the voltage down so that the voltage applied on line 76 as one input to Operational Amplifier A2 is the float voltage reduced by a predetermined amount, represented by the designation $V_{b/k}$. A Reference $R_b$ is provided on line 16 as the other input signal to Operational Amplifier A2. As previously described, when the Reference $R_b$ compares to the scaled down voltage applied on line 76, it is determined that the Battery VB is fully charged, and the Operational Amplifier A2 will provide a High signal on line 18. When the battery is not fully charged, the BCH signal on line 18 will be Low and will be utilized to control the activation of successive charging current generating cycles.

The Charge Cycle Control circuitry shown within dashed block 20 utilizes a Clock Oscillator 80, for providing a regularly occurring sequence of Clock Pulses CL on line 82 as input signals to Inverter circuit 84. A bi-stable Flip-Flop 86 has a Set terminal S and a Reset terminal R. The output terminal of Inverter 84 is coupled by line 85 to the S terminal and line 24 is coupled to the R terminal. Flip-Flop can be selected from various circuits that are bi-stable in nature and are known in th, art, and for this embodiment function such that when a High signal is applied at the S input terminal, a High signal is provided at the Q output terminal to line 88. Once set by the application of a High input signal to S terminal, it will continue to provide the High output signal at the Q output terminal until it is caused to switch by the application of a High signal to the Reset terminal R. When reset, the Flip-Flop will provide a Low signal at the output terminal Q until such time as a subsequent setting signal is applied to input terminal S. A first NAND circuit 90 and a second NAND circuit 92 are utilized to control the sequencing of enabling or disabling the occurence of activation of the Charging Current Switch Driver 28. The output terminal of NAND 90 is coupled by line 94 as one input to NAND 92. NAND 92 is a 3-input circuit that receives a second input on line 88 from Flip-Flop 86 and a third input on line 82a from the Clock Oscillator 80. Each of the NAND circuits operates such that a Low output signal will be generated only when all input signals are High. A Low input signal on any line will result in the output signal being High. The output terminal of NAND 92 is coupled to circuit junction 96. Circuit line 26 couples circuit junction 96 to one terminal of Resistor R1 and provides the pre-drive signal PDR thereto. Circuit junction 96 is coupled via wire 98 as one input to NAND 90, and the second input terminal of NAND 90 is coupled by line 18 to the output terminal of Operational Amplifier A2.

NAND circuits, bi-stable Flip-Flop circuits, Inverter circuits, Clock Oscillator circuits and Operational Amplifier circuits of the type utilized and contemplated are available commercially and need not be described in detail as to their circuit operation, it being understood that their logical functioning, drive levels, power supply requirements will be selected to be compatible with the functioning of the circuitry that is described and shown in detail. Similarly, Pulse Transformer T1 and Current Transformer T2 are components that are well-known and available commercially. The source of Reference $R_c$ and Reference $R_b$ are not shown, but will be reference supplies selected to accommodate use in comparison to the voltage values against which comparison will be made by Operational Amplifiers. The logic voltage V will be selected for operational requirements of the circuit components selected.

Figure 3:
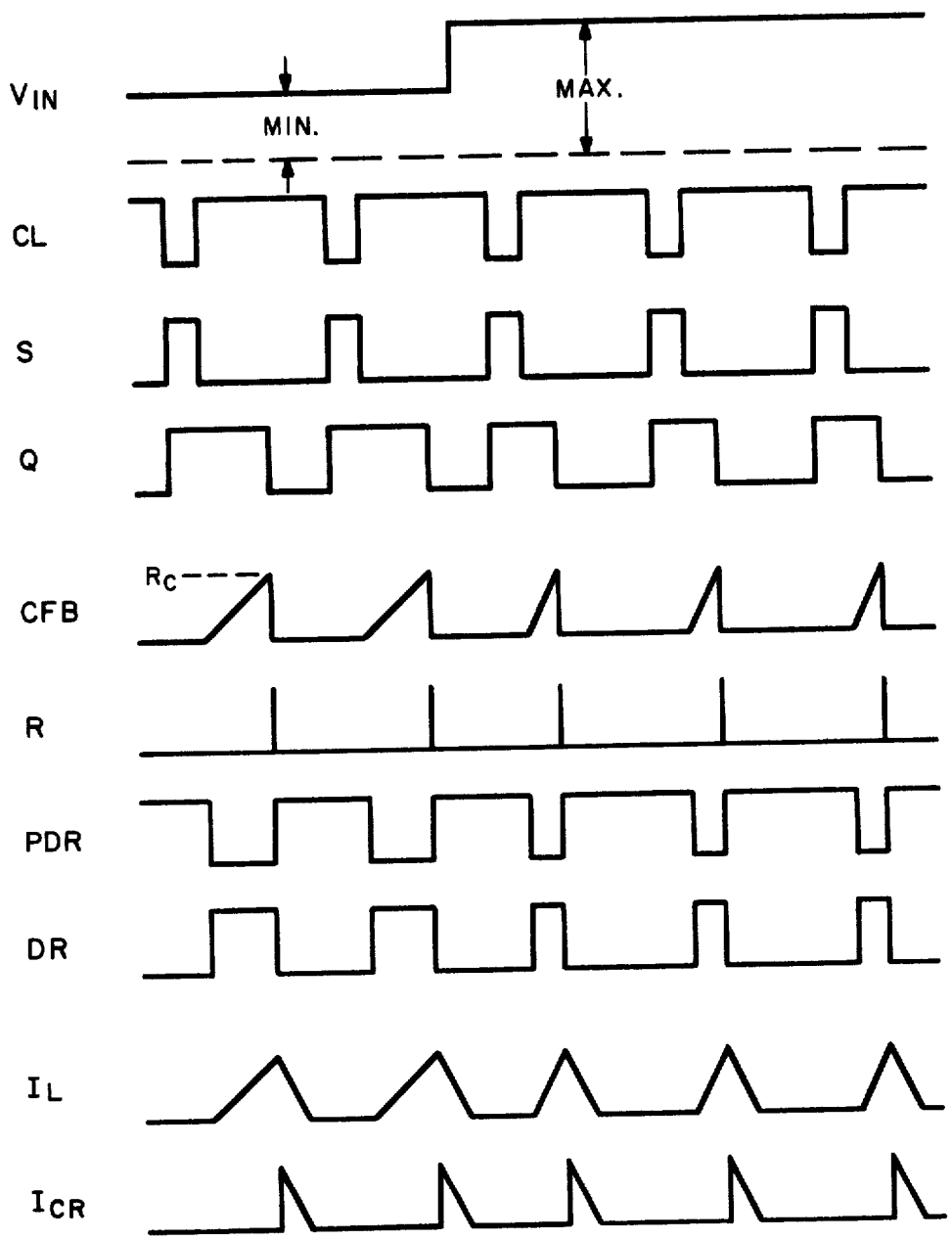
FIG. 3 are idealized illustrative wave forms that illustrate the functioning of the battery charging system.

FIG. 3 are idealized illustrative wave forms that illustrate the functioning of the battery charging system. The wave form representing the Charging Voltage $V_{IN}$ indicates that the Charging Voltage can vary between a predetermined selected minimum value and a predetermined selected maximum value. The $V_{IN}$ is not regulated, and variations in the voltage amplitude will result in variations in the duration of the charging current pulses $I_{Q3}$ and current pulses through Inductor L1 indicated by wave form $I_L$. There will also be noted that there are variations in the feedback signal CFB in that it will take longer for the Inductor L1 to charge to the predetermined level for the lower voltage input as compared to the higher voltage input. The changes in the feedback signal will result in changes in the drive pulses DR and PDR. The Clock signals CL are basically logic pulses that are of a negative excursion and the Setting pulses for the Flip-Flop are basically positive excursion pulses. The duration for which the Flip-Flop will remain set and providing a High output signal at output terminal Q will vary depending upon level of the Charging Voltage as determined by the rate at which the Inductor L1 is charged as determined by the feedback signal CFB.

Considering FIG. 2a, FIG. 2b and FIG. 3 simultaneously, the circuit operation will be described. When the BCH signal is Low, thereby indicating the Battery is not fully charged, the Low signal to NAND circuit 90 will result in a High signal on line 94. When the Clock Oscillator 80 provides a Low signal on line 82, there will also be a Low signal applied on line 82a during the negative excursion of the Clock. The Low signal applied to Inverter 94 will result in the application of a High signal on line 86 to the S input terminal resulting in Flip-Flop 86 being set to provide a High signal on line 88. This will continue until reset. When the Clock Oscillator switches to provide a High signal on line 82, there will also be a High signal applied on line 82a. At this point, NAND circuit 92 will have High signals applied to all three input terminals and will produce a Low output signal to junction 96. See wave form PDR. The Low PDR signal results in turning Transistor Q1 to the non-conducting state and results in the DR signals at the base of Transistor Q2 causing it to be turned to the current conducting state. When Transistor Q2 is conducting, Pulse Transformer couples a signal to the base circuit of Transistor Q3 which causes it to conduct current as previously described. Simultaneously with the application of the Low PDR signal to line 26, the same signal is applied to line 98 as a second input signal to NAND 90.

The current flow $I_{Q3}$ is sensed by Current Transformer T2, is rectified to Diode CR2, and is converted to a voltage across Resistor R6 for purposes of applying a feedback voltage CFB to the Operational Amplifier A1. When current flow has proceeded to the point of build-up while charging Inductor L1 to a point that meets the voltage equivalent determined by Reference $R_c$, the Operational Amplifier A1 will provide the reset R pulse on line 24 to Flip-Flop 86 thereby causing it to switch states. See the wave form identified CFB and the wave form R. The resetting of Flip-Flop to produce a Low signal on line 88 results in NAND circuit 92 being switched to provide a High output signal PDR. This High output signal is fed back on line 98 as one input to NAND 90 and is simultaneously fed to line 26 where it drives Transistor Q1 through the current conducting state, thereby resulting in a drive signal DR to the base of Transistor Q2 which causes it to switch to the non-current conducting state. This removes the drive from Pulse Transformer T1 and causes Transistor Q3 to be biased to the current non-conducting state. This terminates current flow $I_{Q3}$. $I_L$ current continues to flow through Diode CR3 until Inductor L1 is discharged. See wave forms $I_L$ and $I_{CR}$.

The process just described repeats itself upon the application of the next subsequent Low excursion of the Clock Oscillator output signal CL. When the sensed battery voltage reaches the Reference $R_b$ level, as determined by Operational Amplifier A2, its output signal BCH goes High thereby indicating that the charging process should stop. If the BCH signal goes High while Transistor Q3 is still conducting, the charging process does not terminate until the completion of a cycle as determined when the PDR pulse goes High. It will be recalled that when PDR goes High, that it indicates the termination of a charging current pulse. This will be caused by the High input signal on line 18 and the High input signal on line 98 causing NAND circuit 90 to provide a Low signal on line 94 thereby holding NAND circuit 92 disabled and non-responsive to further functions of the Clock Oscillator 80 and the Flip-Flop 86 until such time as the voltage level decreases such that the control signal BCH again goes Low. By holding the charge operation active until the occurence of the High PDR signal, it assures that the charging of the Battery VB stops only when the no-current level of the battery is at the charged voltage level. This is necessary since the sensed voltage level of the Battery will be higher when charging current is flowing due to the internal resistance of the Battery. Accordingly, it may be sensed as fully charged during the occurence of the charging pulse, when in fact it is not charged to the full voltage level as determined when no current is flowing. Should that occur, the Operational Amplifier A2 will release the High signal on line 18, and the Low signal will again enable a further charging cycle.

The logic circuitry is selected to utilize standard TTL and utilizes V of 25 volts nominally. Rb and Rc values of 2.5 volts are effective. The Clock can be a type 5-55 timer and operates nominally at a rate of 50 kHertz. The Inductor L1 can be illustratively 200 micro Henry. The Flip-Flop can be a type 74101 circuit and the Operational Amplifiers can be type LM-324 circuits. The Transistors Q1 and Q2 can be 2N3735 circuits and the Transistor Q3 can be type 2N6308. Characteristic Resistor values can be R1-10,000 ohms, R2-1000 ohms, R3-200 ohms, R4-50 ohms, R5-10 ohms, R6-100 ohms, R7-10,000 ohms, and R8-1000 ohms. It is of course understood that the foregoing circuit types and component values are for one embodiment only, and other operational rates and voltage levels would require different component selection, but would fall within the scope of the invention.

Having described the embodiment of the invention, and having set forth the various purposes and advantages, what is intended to be protected by Lettes Patent is set forth in the appended claims.

What is claimed is:

1. A battery charging system for charging a battery from an unregulated voltage source by delivering fixed maximum amplitude pulse width modulated constant current charging signals comprising:

input means for coupling to a source of charging voltage;

battery voltage level determining means for determining when the battery is fully charged and for providing a charge disabling signal when the battery is fully charged;

charging current switch means coupled to said input means, and including control means, said charging current switch means for causing conducting of charging current when said control means is activated;

charging current sensing means coupled to said charging current switch means for sensing the levels of said charging current and for providing current level indicating signals in response to said levels;

charging current comparison means coupled to said charging current sensing means for comparing said charging current to a predetermined reference for providing reset signals when a predetermined current level comparison is sensed;

non-dissipative impedance means coupled to said charging current sensing means for providing said charging current to the battery being charged;

charge cycle control means coupled to said battery voltage level determining means and said charging current comparison means for sequentially providing activating signals for successive charge cycles until said battery voltage level determining means indicates the battery is fully charged, wherein said charge cycle control means includes clock means for providing clocking signals at a predetermined frequency;

flip-flop means having output means for providing signals indicative of its state, set input means coupled to said clock means for causing said flip-flop means to exhibit a first state in response to said clocking signals, and reset input means coupled to said charging current comparison means for causing said flip-flop means to exhibit a second state in response to said reset signals;

logic means responsively coupled to said battery voltage level determining means, said clock means, and said flip-flop means for providing said activating signals to said charging current switch driver means for controlling activation of said charging current switch means to provide said charging current; and wherein said logic means includes gating means for controlling termination of the charging of the battery, said gating means having first gate input means coupled to said battery voltage level determining means, second gate input means, and gate output means for providing a disabling signal when the battery is fully charged;

enabling means for controlling activation of said charging current switch driver means, said enabling means having first enable input means coupled to said gate output means, second enable input means coupled to said clock means, third enable input means coupled to said flip-flop means, and enable output means coupled to said second gate input means and to said current switch driver means for providing said activating signals to said charging current switch driver means when signals received on said first, second and third enable input means have a predetermined relationship; and charging current switch driver means coupled intermediate said charge cycle control means and said charging current switch means for providing drive signals for activating said control means and causing said charging current switch means to provide charging current in response to each of said activating signals.

2. A battery charging system as in claim 1 wherein said battery voltage level determining means includes voltage comparator means for providing charge enabling signals indicative that the battery is not charged to a predetermined voltage level and charge disabling signals when the battery is fully charged, said disabling signals not being effective until the end of an active one of said charging cycles, voltage reference input means coupled to said voltage comparator means for receiving predetermined charge voltage reference signals, and sensed voltage input means coupled to said voltage comparator means for receiving sensed voltage signals indicative of the charge level of the battery both during and at the termination of each of said charging cycles.

3. A battery charging system as in claim 1 wherein said charging circuit switch means comprises switching transistor means having a first electrode coupled to said control means;
a second electrode coupled to said input means;
and a third electrode coupled to said charging current sensing means.

4. A battery charging system as in claim 3 wherein said control means includes pulse transformer means having first drive winding means coupled to said first electrode and said third electrode for biasing said transistor to conduct in response to said drive signals.

5. A battery charging system as in claim 3 wherein said charging current sensing means includes current transformer means having first current winding means coupled in series between said third electrode and said impedance means for sensing the level of said charging current flowing therethrough, and second current winding means; and
discharge means coupled to said first current winding means for discharging said current transformer means when said charging current is terminated.

6. A battery charging system as in claim 5 wherein said charging current comparison means includes comparator means having reset output terminal means, reference input means for receiving predetermined reference signals, and feedback input means for receiving feedback signals indicative of the level of charging current flow; and
feedback means coupled to said second current winding means and said feedback input means for providing said feedback signals to said comparator means.

7. A battery charging system as in claim 1 wherein said impedance means includes inductor means having first inductor terminal means coupled to said charging current switch means and second inductor terminal means coupled to the battery being charged for providing charging current signals thereto; and
inductor discharge means coupled to said inductor means and to the battery being charged for providing a discharge path for said inductor means when said charging current is terminated.

8. A battery charging system as in claim 4 wherein said charging current switch driver means comprises:
second winding means in said control means;
first transistor means coupled to said charge cycle control means for providing pre-drive signals in response to said activating signals;
second transistor means coupled to said first transistor means for providing said drive signals;
means for coupling said second transistor means to said second winding means; and
pulse transformer discharge means coupled to said second winding means for discharging said pulse transformer when said second transistor means does not provide said drive signals.

9. A battery charging system for charging a battery from an unregulated voltage source by delivering pulse width modulated constant current charging signals, said charging system comprising:
input means for coupling to a source of charging voltage;
charging current switch means coupled to said input means for providing charging current when conducting, said charging current switch means including first transformer control means for selectively switching said charging current switch means between a current conducting state and a current non-conducting state in response to control device signals;
charging current sensing means coupled to said charging current switch means for sensing levels of said charging current and for providing current level signals indicative of said levels of said charging current said charging current sensing means including current transformer means having primary winding means connected to said charging current switch means and secondary winding means;
inductor means having an input terminal coupled to said primary winding means and an output terminal for coupling to a battery to be charged, and arranged for charging during conduction of said charging current while minimizing heat generation during said charging;
discharge means coupled across said inductor means and the battery being charged for discharging energy from some inductor means through the battery when conduction of said charging current is terminated;
charging current compare means responsively coupled to said charging current sensing means for converting said current level signals to equivalent voltage signals and comparing said voltage signals to a first predetermined reference voltage and for providing a reset signal when comparison is detected, the time required for generation of said reset signals determined at least in part by the level of the charging voltage applied;
battery voltage level determining means for coupling across the battery to be charged for continously sensing the battery voltage level and comparing it to a second reference voltage for determining when the battery is fully charged and for providing a battery charged signal for use in terminating charging when comparison to said reference voltage is found;
charge cycle control means for controlling successive charge cycles until the battery is fully charged, said charge cycle control means including
clock means for generating clock pulses at a predetermined frequency for use in controlling said charge cycles,
bistable flip-flop means having a set input means coupled to said clock means for causing said flip-flop means to exhibit a set state in response to said clock pulses, reset input means coupled to said charging circuit for causing said flip-flop means to exhibit a reset state in response to said compare means reset signal, and output means for providing pulse width modulated set signals indicative respectively of said set condition for controlling the duration of said charging current, enabling logic means coupled to said clock means and said flip-flop means for providing drive signals in response to said set state signals;

charge termination logic means coupled to said enabling logic means and said battery voltage level determining means for inhibiting further ones of said drive signals in response to said battery charged signal at the completion of one of said charge cycles for inhibiting further charging as long as said battery charged signal is present; and charging current switch driver means coupled intermediate said enabling logic means and said first transformer control means for providing said control drive signals to said charging current switch means in response to said drive signals for causing said charging current to be constant amplitude limited until charging is terminated.

* * * * *